United States Patent [19]

Weber

[11] 4,452,197

[45] Jun. 5, 1984

[54] VEHICLE ANTI-THEFT IGNITION FOILING DEVICE

[76] Inventor: Harold J. Weber, 20 Whitney Dr., Sherborn, Mass. 01770

[21] Appl. No.: 394,645

[22] Filed: Aug. 11, 1982

[51] Int. Cl.³ .................................................. B60R 25/04
[52] U.S. Cl. .................................. 123/198 B; 340/64; 307/10 AT; 180/287
[58] Field of Search .................. 123/198 B, 198 D; 340/63, 64; 307/10 AT; 180/287

[56] References Cited

U.S. PATENT DOCUMENTS

| | | | |
|---|---|---|---|
| 1,442,311 | 1/1923 | Watson | 123/198 B |
| 1,854,868 | 4/1932 | Talkes et al. | 123/198 B |
| 1,940,380 | 12/1933 | Ulloa | 123/198 B |
| 2,022,725 | 12/1935 | Lazarus et al. | 123/198 B |
| 2,030,939 | 2/1936 | Robinson | 123/198 B |
| 2,580,080 | 12/1951 | Dewhirst | 123/198 B |
| 4,019,489 | 4/1977 | Cartmill | 123/198 B |
| 4,141,332 | 2/1979 | Wyler | 123/198 B |
| 4,300,495 | 11/1981 | Trevino | 123/198 B |

OTHER PUBLICATIONS

Practical Electronics, "Car Anti-Theft Device", Alastair Mutch, Oct. 1980, vol. 16, No. 10, p. 41.

Elektor, "Stop Thief", B. H. J. Bennink, Apr. 1980, vol. 6, No. 4, p. 28.
Elektor, "Car Anti-Theft Protection", B. H. J. Bennink, Jul. 1979, No. 7, p. 23.

*Primary Examiner*—Ira S. Lazarus

[57] ABSTRACT

Ignition foiling device which serves to interfere with the efficient operation of a vehicle ignition system after a brief, predetermined period of time has elapsed subsequent to the unauthorized start-up of the vehicle engine. The foiling device thereby serves to thwart the theft, or other confiscative act directed at a protected vehicle, through first allowing the vehicle engine to start-up in an apparently normal manner and operate for a brief period of time, thereby allowing the illicit operator to drive the vehicle into an attention getting location. The ignition system then becomes irregularly interrupted in such a way that the illusion of misfiring and performance malfunction of the engine is created which serves to discourage the illicit operator from continuing with the attempted theft. The invention couples with the usual components comprising a spark ignition vehicle engine and, through a key or secret switch, it can be defeated by a legitimate operator while an unlawful operator will most likely be unable to overcome the invention's crippling effect on the vehicle's operation.

14 Claims, 4 Drawing Figures

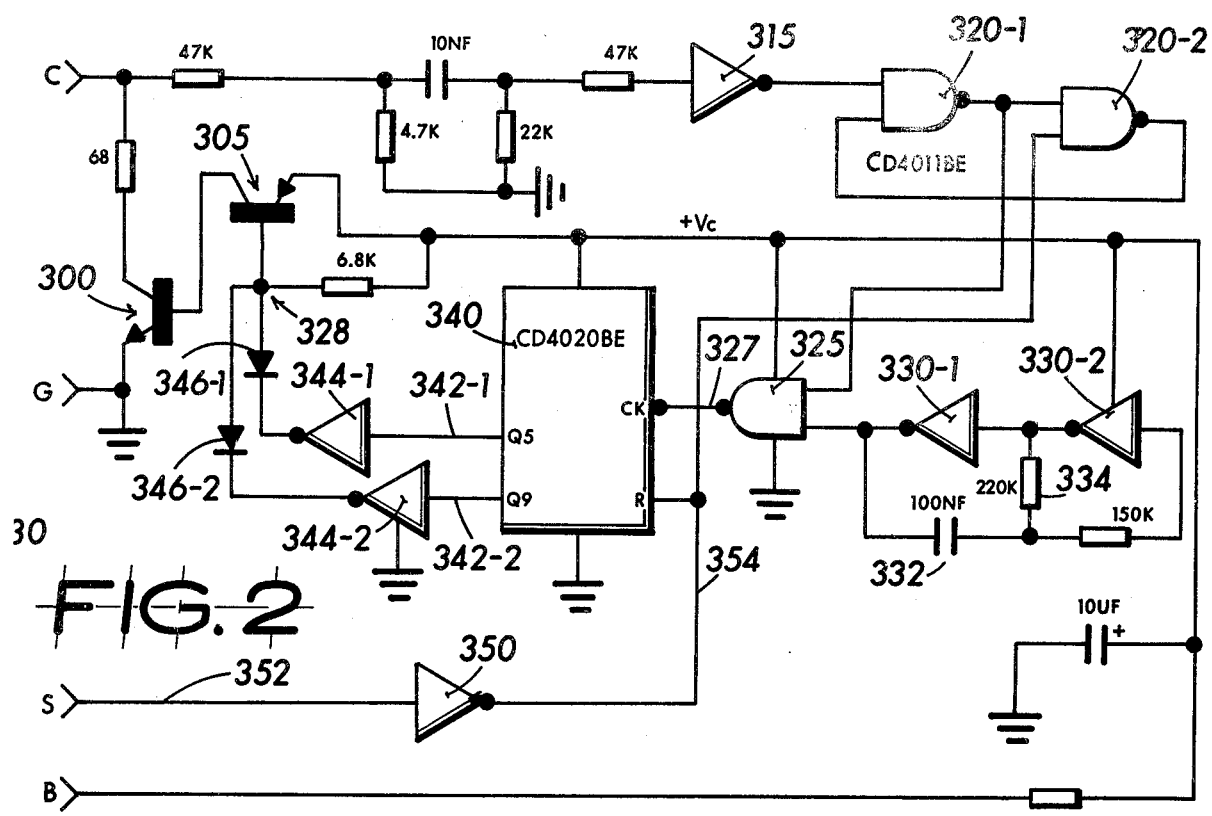
FIG. 2
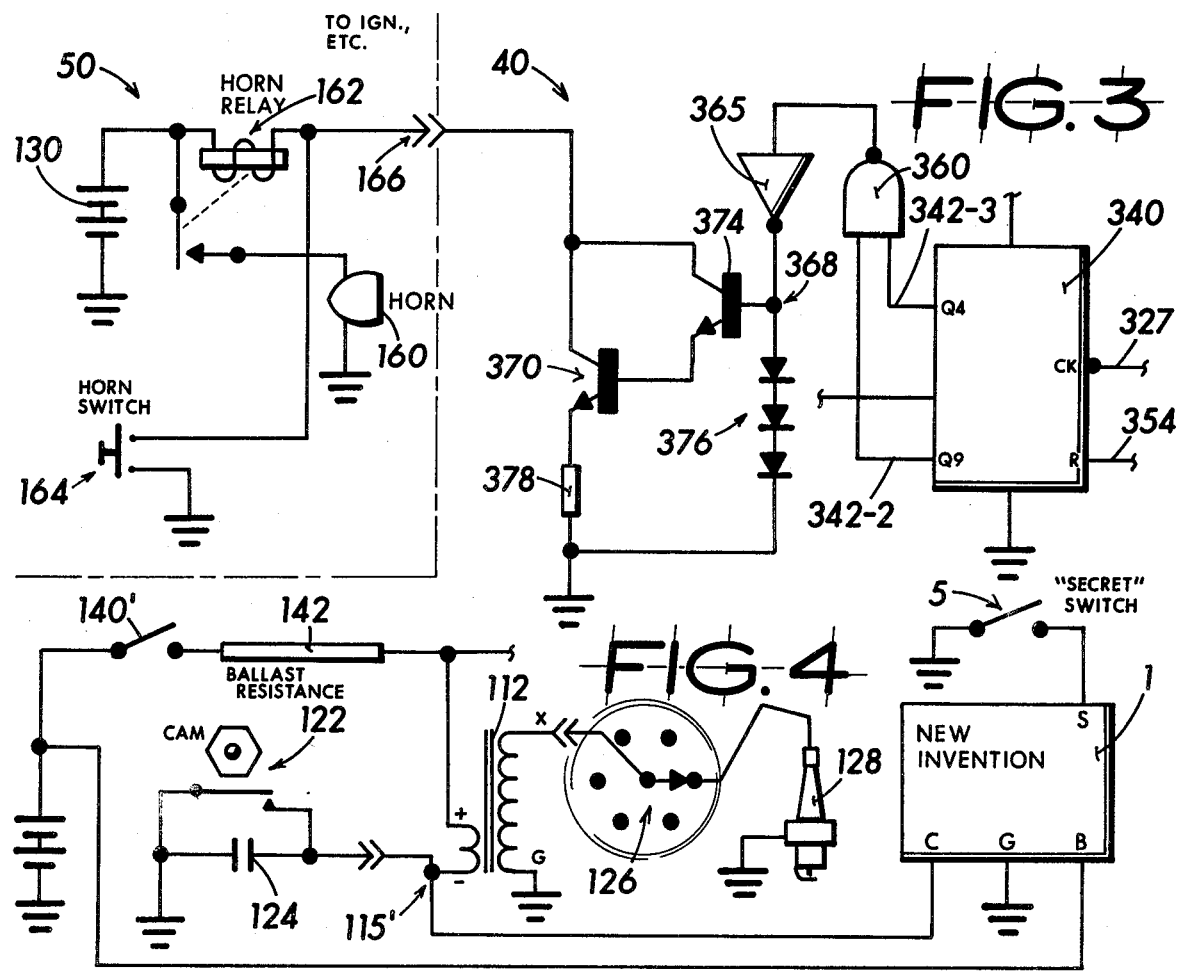
FIG. 3
FIG. 4

VEHICLE ANTI-THEFT IGNITION FOILING DEVICE

BACKGROUND OF INVENTION

The protection of a motor vehicle against illegal confiscation, viz theft, has been accomplished before through the installation of a hidden fuel shutoff valve. When such a valve is turned "off", the protected vehicle is allowed to start up in a normal way and operate for a brief period of time during which it consumes the limited amount of fuel contained in the carburetor bowl, etc. This limited operation of the engine encourages the thief to drive the vehicle from its obscure location where the thief feels safe, to a more public view where continued theft activity would be discouraged by exposure. Furthermore, the time the vehicle operates before the limited fuel is consumed will vary from one vehicle to another due to differences to residual fuel left after the cutoff valve, and the vehicle's consumption rate. The time will also vary in any given vehicle depending on the presumably illicit driver's driving style, e.g. racing the engine will consume the limited amount of fuel more quickly than a liesurly, idle speed driveaway. The inclusion of such cutoff devices have limited popularity because it involves difficult, costly installation which has limited variability in the choice of a good hidden location for the shutoff device.

It therefore appears to me that a means for producing the same kind of desired irregular time duration limited drivability effect prior to total vehicle disablement is desirable. If such a device can be easily installed at low cost and without intercoupling with the vehicle's fuel system. The limited operation of the vehicle electrical ignition system is selected by me as the best embodiment for my invention, in that intercoupling with the ignition system is easily undertaken, even by the "Saturday afternoon mechanic". Since the operation is entirely electric in nature, the secret switch can be situated in a multitude of locations unique to each operator's choice. This advantage of course makes the switch discovery much more unlikely, even by a skilled potential thief. The likelihood of easy discovery is largely determined by the ingenuity of the individual installer's choice of location options. Additionally, the hidden switch may be key operated.

The resulting theft deterring effect which would be desirable would produce an experience quite similar to that now produced by fuel cutoff, wherein the vehicle starts up, but then soon exhibits erratic running behaviour which shortly becomes progressively worse, or else the vehicle falters altogether in its operation after a short period of semmingly normal operation. This false start generally serves to enable the thief to have to expose himself in a way that should lead to his abandonment of the theft project. It also produces the illusion of faulty vehicle operation, which may discourage the thief.

SUMMARY OF INVENTION

My invention relates to an ignition foiling means which couples with the usual ignition coil and distributor combination associated with an internal combustion, spark ignition vehicle engine. The ignition pulse train which flows to the ignition coil primary is interfered with an a sporadic way, or else stopped altogether after an anomalous period of time, by a fast acting shunting switch such as a thyristor or a transistor. The shunting switch may be turned-on after an inconstant period of time has elapsed after the unauthorized startup of the vehicle engine has begun. In practice of my invention the ignition foiling means is disabled or shut-off by the authorized operator of the vehicle through a separate and usually hidden key switch, or otherwise obscured secret switch. In the event that an illegal operator trys to obtain engine start-up, the ignition foiling means will of course not be defected and thereby the foiling control effect comes into play. In my usual embodiment, the vehicle engine is allowed to start-up in a seemingly normal way and to run for a seemingly unpredictable period of time, usually on the order of a few minutes. This serves to encourage the potential thief to forgo the search for the defeating means in the false belief that the vehicle is not protected. This misleading event will usually serve to expose the thief through the obtained drivability of the vehicle which leads the thief to remove the vehicle from the original location and most likely bring it into a more "public" position, whereupon the foiling means comes into play, preferably through the irregular cutting out of ignition pulses in a pattern which produces the illusion of a misfiring engine that progressively becomes more tempremental and more difficult to manage. This produced illusion discourages the thief into abandoning the vehicle, thereby thwarting the actual theft, and making the recovery of the vehicle simple.

The actual time which may elapse from the unauthorized start-up of the vehicle and the onset of ignition fouling may be accomplished most preferably through the actual pulse counting of the ignition pulses arriving from the ignition coil, which means there will be a variable time elapse with each foiling operation, since the time delay depends on engine speed. In yet another embodiment, the foiling time delay is determined by a clock means which produces a relatively constant initial delay period, usually followed by an irregular series of foiling intervals which become progressively more objectionable. Therefore, the overall time elapse from startup until the vehicle operation fails will always be somewhat different, giving the illusion of ordinary failure due to faulty vehicle operation.

Yet another embodiment of my teaching produces, aside from the irregular ignition fouling effect, an irregular honking of the vehicle horn or other such alarm device after the elapse of the initial delay period. This produces an attention getting public outcry which is the bane of nearly any thief's success. The thief is therefore encouraged to abandon the vehicle where it stands, perhaps moving on to a vehicle not protected by my new invention.

DESCRIPTION OF DRAWINGS

FIG. 2 Recombination of FIG. 1 teaching acting to produce irregular foiling action.

FIG. 3 Hookup for operating vehicle horn as adjunctive alarm device.

FIG. 4 Overview of new invention coupled with conventional spark ignition system of a vehicle.

DESCRIPTION OF INVENTION

Figure 1:
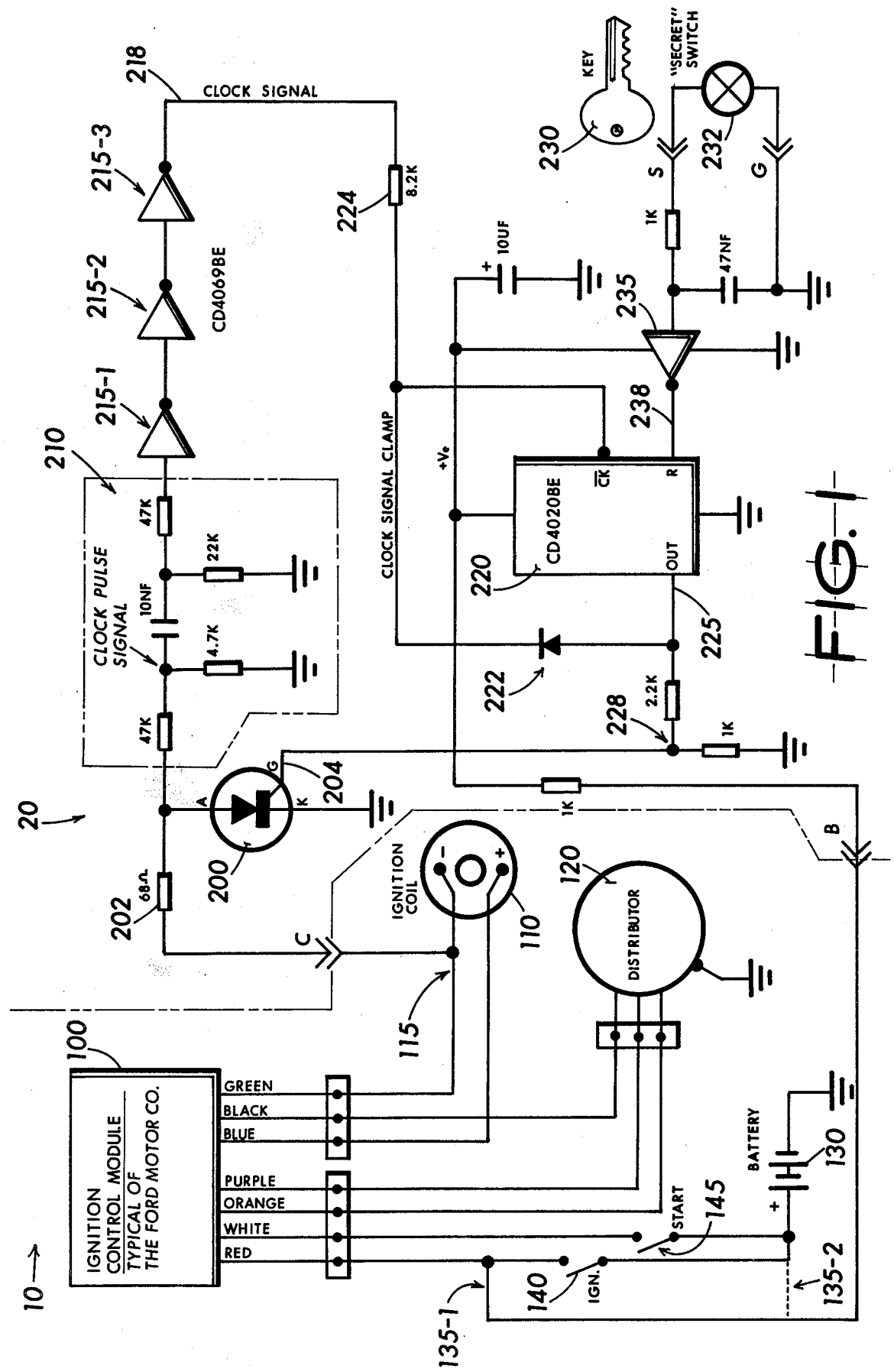
FIG. 1 Overview interconnection of a preferred embodiment for my invention with a vehicle ignition system.

The essence of my invention appears in FIG. 1 wherein generally in zone 10 the components which make up the usual vehicle ignition system are shown. The particular ignition embodiment depicted is that of a representative Ford Motor Company vehicle, including the ignition control module 100 which is of the electronic ignition type. A more full detail appears on page U-43 of "Chilton's Auto Repair Manual 1980", ISBN 0-8019-6850-X. The control module couples with the ignition coil 110 and the distributor 120. A battery 130 supplies power through the ignition switch 140, and the hot start bypass switch 145 that is usually associated with the starting motor relay. My instant invention 20 couples with the ignition coil "—" terminal line 115 through a resistor 202 to the ANODE of a thyristor 200, and through a clock pulse forming network 210, therefrom through cascade inventers 215-1, 215-2, 215-3 yielding a clock signal on line 218 that couples through resistor 224 to the $\overline{CK}$ "clock" input of a binary counter 220. The clock signal frequency is proportional to engine speed, and thereby leads to significant variation in overall counter advancement time. D.C. power for operation of my invention may be obtained by the connection 135-1 with the switched side of the ignition switch 140. More preferably, the connection 135-1 may instead be connected as shown by the broken line 135-2, whereby D.C. power is permanently applied to the anti-theft module, being allowable due to the infinitesimal current flow therethrough. In the event of illegal, attemped vehicle operation, the "secret" switch 232 which may be actuated by a "key" 230 is open, thereby producing a HIGH level on the inverter 235, resulting in a LOW on the "R" (reset) input of the counter 220. This serves to enable the count advance of the counter 220 and after a predetermined number of pulses have occurred, the output 225 line is driven HIGH. This HIGH signal couples through diode 222, pulling the clock input HIGH and disabling further counting action by the counter. The HIGH signal on line 225 couples through resistors to juncture 226 producing a current signal to the gate input 204 of the thyristor 200, enabling the thyristor and effectively shorting the ignition coil signal on line 115 to ground, thereby inhibiting further ignition operation. When normal, authorized operation of the vehicle is to be obtained the secret switch 232 is closed and the input to inverter 235 is LOW producing a HIGH on the reset input of counter 220 that disables the counter.

A further enhanced embodiment appears in FIG. 2, wherein a multivibrator comprising inverters 330-1, 330-2, capacitor 332, and resistor 334 produces a low frequency clock signal to an input of the NAND gate 335. The ignition pulse signal brought in an terminal "C" couples through inverter 315 to actuate a latch comprising NAND gates 320-1, 320-2 so that when an ignition pulse occurs, the output of latch 320-1 is driven HIGH. This enables clock pulse coupling to the CK input of counter 340 by line 327. The counter advances producing a HIGH output on the Q5 output line 342-1 and the Q9 line 342-2 in due course. The pulses produced on the Q5 output couple through inverter 344-1 and produces a signal at juncture 328 that serves to turn-on transistor 300 by way of transistor 305 thereby momentarily shorting out the ignition pulses. When the counter advances to a HIGH level output on Q9 output 342-2, the duration of this HIGH output will be of sufficient period that the signal coupled through inverter 344-2 to juncture 328 serves to start out the ignition pulses through the associated transistors and to effectively kill the engine in most cases. In the event that the engine is not absolutely killed, the sequency recurs, creating the illusion of "problems" with the engine which ought to, in most cases, thwart the potential vehicle theft. Steering diodes 346-1, 346-2 isolate juncture 328. A low signal on line 352, as derived from a properly actuated defeat switch and coupled through inverter 350, serves to DISABLE counter 340.

A further embodiment enhancement appears in FIG. 3 wherein the usual vehicle horn circuitry 50 is adapted in combination with my invention 40, as previously taught in my FIG. 2, to produce an alarm sounding effect that further discourages any potential thief. The improvement is wrought by coupling NAND gate 360 between the Q4 and Q9 outputs lines 342-2, 342-3 of the counter 340 thereby producing an irregular pulse train of signals through inverter 365 as coupled to the base 368 of transistor 374, in cascade with transistor 370. The further combination of the emitter resistor 378 and the diode string 376 acts to provide current limiting through the transistor 370 preventing destruction of the transistor switch in the event of misconnection of my invention with the vehicle's horn circuitry through terminal 166, etc. The vehicle battery 130 finds a path through the contacts of the horn relay 162 to the horn 160. This relay, which is usually activated by the driver actuated horn switch 164, is now intermittantly activated by the on and off pulsing of transistor 370 through connection 166.

When the horn honking racket occurs in combination with the irregular ignition performance, an improved persuasive theft deterrent is clearly produced by this invention.

The hookup of my new invention 1 together with the secret switch 5 is clearly shown in FIG. 4 as combined with a typical vehicle ignition system. The usual vehicle key switch 140' connects through a ballast resistance 142 to a primary terminal of an ignition coil 112. The other primary terminal 115' couples with the ignition condensor 124 and cam operated breaker points 122. The coil secondary couples with the distributor rotor 126 that selects one of several spark plug connections 128.

In the usual embodiment of my new invention, the electronic control circuitry including the semiconductor switch is contained in a resin encapsulated module which is connected into the usual wiring harness circuitry of the protected vehicle in such a way as not to be readily noticed.

Although my invention is taught with reference to some specific example embodiments, it is to be clearly understood that these examples serve merely to describe functionality of my invention and that all further modifications and equivalents are clearly anticipated, as covered within the scope of my appended claims.

What I claim is:

1. Ignition foiling means, adapted to a motor vehicle engine means, comprising therefor:
    a. an ignition coil means having a high tension secondary, and a primary with at least a first terminal coupled in series with an interrupter means and a source of d.c. power that is effectively returned to a second terminal thereof;
    b. said interrupter means coupled with said engine means and effective to produce a plurality of ignition control pulse signals synchronized therewith;
    c. defeating means coupled with said interrupter means to effect controllable inhibition of said pulse signals;

d. irregular signal means coupled with said defeating means and effective therewith to control an effectively alternate period of said pulse signal inhibition subsequent to the elapse of at least one effectively inconstant period of pulse signal enablement; and, e. operator over-ride means coupled with said defeating means and effective to selectively enable and disable the controllable inhibition effect of said defeating means.

2. Foiling means of claim 1 wherein said defeating means comprises semiconductor switch means effectively couples in parallel with said interrupter means.

3. Foiling means of claim 2 wherein said irregular signal means comprises a source of clock pulses and digital counter means effectively coupled with said switch means to alternately enable and disable conduction therethrough, subsequent to the elapse of various members of clock pulses.

4. Foiling means of claim 1 wherein said inconstant period of pulse signal enablement is defined by the effective counting of a predetermined number of the effectively variable frequency pulses comprising said ignition control pulse signal.

5. Foiling means of claim 1 wherein said override means comprises a secreted switch means which may be key operated.

6. Foiling means of claim 2 wherein said irregular signal means comprises a source of clock pulses and a digital counter means effectively coupled with said switch means and effective to produce a brief period of switch means conduction after the lapse of a predetermined period of time subsequent to the producting of the first effective ignition pulses, whereupon further said brief period of switch means conduction may be alternated several times with periods of nonconduction thereby producing the illusion of a misfiring engine, and whereupon further after a certain number of alternate effect said brief periods have occurred, substantially constant which means conduction may ensue thereby stopping the engine means.

7. Foiling means of claim 1 further comprising alarm means effectively activated by said irregular signal means.

8. Foiling means of claim 7 wherein said alarm means may comprise said vehicle horn means, and said irregular signal means may produce a signal pattern effecting attention-getting irregular recurrence honking sounds therefrom.

9. Foiling means of claim 4 wherein a plurality of anomalous periods of pulse signal enablement are followed in alternation by anomalous periods of pulse signal inhibition wherein preferably each successive period of inhibition effectively becomes longer whilst each successive period of enablement effectively becomes shorter.

10. Foiling means of claim 1 wherein said period of pulse signal enablement and period of pulse signal inhibition may be plurally alternate, and the period of each may preferably be of irregular duration.

11. Ignition foiling method adapted for thwarting the unauthorized operation of a motor vehicle through producing the illusion of improper engine operation, having the steps of:

a. providing spark ignition pulses for said engine; and, b. producing an irregular signal effective to inhibit said spark ignition pulses for an effectively alternate period subsequent to the elapse of at least one substantially inconstant period of enablement of said spark ignition pulses.

12. Foiling method of claim 11 wherein said alternate periods of spark ignition inhibition and enablement may preferably repeat cyclically several times and wherein further the duration of each successive period may differ.

13. Foiling method of claim 11 wherein said inconstant period may be produced by effectively utilizing the normally variated frequency of the spark ignition pulses to separately determine the time of each successive period.

14. Foiling method of claim 11, having the further step of:

producing a seriate alternation of periods of spark ignition enablement and inhibition, wherein said effective periods of enablement become progressively shorter relative with the periods of inhibition, thereby producing the illusion of progressively worsening engine operation.

* * * * *

UNITED STATES PATENT AND TRADEMARK OFFICE
CERTIFICATE OF CORRECTION

PATENT NO. : 4,452,197
DATED : June 5, 1984
INVENTOR(S) : Harold J. Weber

It is certified that error appears in the above-identified patent and that said Letters Patent are hereby corrected as shown below:

col. 2, line 9:   "defected" should read --defeated--.

col. 3, line 51:  "in an terminal" should read --in on terminal--.

col. 3, line 66:  "start" should read --short--.

col. 5, line 13:  "couples" should read --coupled--.

col. 5, line 19:  "members" should read --numbers--.

col. 5, line 41:  "which means" should read --switch means--.

Signed and Sealed this

Twenty-sixth Day of March 1985

[SEAL]

Attest:

DONALD J. QUIGG

Attesting Officer   Acting Commissioner of Patents and Trademarks